United States Patent

Harris

Patent Number: 5,946,373
Date of Patent: *Aug. 31, 1999

[54] TOPOLOGY-BASED FAULT ANALYSIS IN TELECOMMUNICATIONS NETWORKS

[75] Inventor: Roger D. Harris, Colorado Spring, Colo.

[73] Assignee: MCI Communications Corporation, Washington, D.C.

[*] Notice: This patent is subject to a terminal disclaimer.

[21] Appl. No.: 09/031,073

[22] Filed: Feb. 26, 1998

Related U.S. Application Data

[63] Continuation of application No. 08/669,259, Jun. 21, 1996, Pat. No. 5,771,274.

[51] Int. Cl.⁶ .............................. H04M 1/24; H04M 3/08; H04M 3/22

[52] U.S. Cl. ................................. 379/26; 379/10; 379/16; 379/34; 370/242; 370/250; 340/825.06; 340/825.16

[58] Field of Search ................................ 379/1, 4, 9–10, 379/12, 14–15, 28, 25–26, 34; 370/241, 242, 243, 244, 246, 248, 250; 375/224, 228, 250; 340/825.06, 825.11, 825.15, 825.16, 825.17

[56] References Cited

U.S. PATENT DOCUMENTS

| | | | |
|---|---|---|---|
| 5,049,873 | 9/1991 | Robins et al. | 379/14 |
| 5,109,296 | 4/1992 | Fukushima et al. | 379/4 |
| 5,309,448 | 5/1994 | Bouloutas et al. | 370/242 |
| 5,373,504 | 12/1994 | Tanaka et al. | 370/248 |
| 5,384,768 | 1/1995 | Fujii | 379/15 |
| 5,563,875 | 10/1996 | Hefel et al. | 370/248 |
| 5,566,162 | 10/1996 | Gruber et al. | 370/242 |
| 5,634,097 | 5/1997 | Ashi et al. | 370/248 |

*Primary Examiner*—Curtis A. Kuntz
*Assistant Examiner*—Binh K. Tieu

[57] ABSTRACT

A method and apparatus for detecting traffic-affecting failures in a telecommunications network; by inferring the most probable location of each such failure, given multiple alarm indicators along a network circuit; correlating circuit alarms to trunk failures, or inferring trunk failures from circuit alarms; inferring the location of major network outages by topologically correlating multiple trunk failures; and filtering alarm reporting to the Fault Management System users such that only the most significant derived or inferred conditions are automatically displayed.

6 Claims, 7 Drawing Sheets

TOPOLOGY-BASED FAULT ANALYSIS IN TELECOMMUNICATIONS NETWORKS

This application is a continuation of U.S. patent application Ser. No. 08/669,259, filed Jun. 21, 1996, now U.S. Pat. No. 5,771,274.

BACKGROUND OF THE INVENTION

Telecommunications equipments are designed to have some means of detecting and reporting traffic-affecting faults. Collecting and displaying these fault alarms is the responsibility of the network Fault Management System (FMS). The functional groups that are the primary users of the FMS are typically called Surveillance, which has responsibility for monitoring equipment faults and initiating repair actions, and Restoration, which has responsibility for rerouting network traffic around an outage.

The alarms generated by network equipments typically identify the affected equipment and the type of fault detected by that equipment. However, a single fault in a network can generate alarm reports throughout the network on any equipment that also transports any of the traffic affected by that fault. It is generally the case that knowledge of network topology (that is, the connections between equipments that define the traffic paths through the network) is not present at the equipment level. Therefore, correlations exist between fault alarm reports that are not immediately obvious without considering the alarms within the context of the network topology.

The following description of the present invention will use the term "circuit" to mean a data traffic carrier or pathway of some specific data capacity through a telecommunications network. Data can only be inserted or retrieved (usually both, since the traffic is two-way) from the end points of this circuit; all other equipments along the path relay the data toward the destination end point.

For efficiency of transmission, multiple circuits of the same capacity are often combined or "multiplexed" together into a single data carrier. This higher-capacity carrier will be called a "trunk", relative to the circuits that is carries. A circuit might be carried by a series of such higher-level trunks on its way to its destination. But each trunk is also a circuit: it provides a specific data-carrying capacity between source and destination end points, and it consists of a series of transmission equipment connections through the network. Trunks of the same capacity can also be multiplexed together to form even higher-level trunks.

The standard digital telecommunications multiplex hierarchy used in the United States consists of: DS-0 circuits (or Digital Signal Level 0) with a capacity of 64 kilobits per second (Kbps); DS-1 circuits of 1.544 megabits per second (Mbps) or 24 DS-0s; DS-2 circuits of 6.312 Mbps or 4 DS-1s; and DS-3 circuits of 44.736 Mbps or 7 DS-2s. Long-haul transmission equipment such as fiber-optic systems combine a certain number of DS-3s, the number being determined by the speed of the specific technology employed. An example would be Synchronous Optical Network (SONET) OC-48 (Optical Carrier Level 48) equipment, which combines 48 DS-3 circuits.

Typically, when a failure occurs on a circuit, the equipment closest to the failure detects the fault ("loss of signal", for example), reports the fault, and propagates an alarm indicator signal in the "downstream" direction on the affected circuit. Alarms are therefore reported in the receive direction on each side of the fault to the far ends of the circuit. Furthermore, if that circuit is a trunk (carrying circuits of a lower capacity level) then the multiplexing equipments at the trunk ends also propagate alarm indicators downstream along those lower-level circuits. As a result, when a major outage occurs a large number of fault alarms are reported. Without considering network topology, it is difficult to determine how many faults there are and which alarms are significant for locating the faults.

Further complicating the situation is the fact that not all equipment connection points provide fault alarm information because of limitations in the equipment (especially older types) or because of limitations within the Fault Management System itself. Moreover, the fault reporting network and remote monitoring subsystems are also subject to failures, so there is always a possibility that some alarms may not be delivered to the Fault Management System.

These complications mean that manual alarm analysis by the FMS users is tedious and time-consuming. This invention is intended to augment the FMS alarm reporting by automating the process of analyzing the transmission equipment alarms in the context of network topology, thereby allowing a faster and more accurate response to a network traffic outage.

BRIEF DESCRIPTION OF THE DRAWINGS

This invention is intended to detect, confirm, and locate major outages in a telecommunications network. The process implemented by this invention uses network circuit topology to correlate equipment alarms and provide the following results: reporting of the most-significant fault alarms; suppressing the reporting of sympathetic alarms downstream from a fault; inferring a trunk outage from circuit alarms, even if no fault has been reported on the trunk; confirming that a reported trunk fault is actually causing a traffic outage if the contained circuits are also in alarm; correlating transmission system trunk outages that share the same path (e.g., fiber optic pairs within the same cable); and making an accurate determination of the location of any faults.

Fault alarm data are collected from network multiplexer and transmission equipments. Each alarm represents a specific fault detected on a particular piece of equipment. These alarms are then correlated to each other by using a database that describes the network topology; this database defines the equipments that implement the network and the connections between equipments. These equipment connections define the routing of circuits and trunks through the network. The topology database determines: which trunk or ordered sequence of trunks contain a given circuit; which circuits are contained within a given trunk; and the topological route through the network for any given circuit or trunk. Using this knowledge of network topology, significant fault alarm events (that is, those most indicative of the location of a failure) can be distinguished from "sympathetic" events (those fault indicators propagated downstream and to lower multiplex levels from a failure) to determine the topographic point of failure as accurately as possible. Moreover, correlated alarms on multiple circuits contained within the same trunk can be used to infer an outage on that trunk, even if no fault alarms have been received from the trunk equipment. Or, if direct alarms have been reported on a trunk, then corresponding alarms on the circuits contained in that trunk serve to confirm that a traffic-affecting outage has occurred (whereas the absence of circuit alarms might indicate that the circuits have been rerouted).

The results of the present process are automatically displayed to the Fault Management System users, and all input fault alarm data that was used to determine each outage is also available to the user upon request. The outage extent and location information is most immediately useful for initiating a traffic restoration plan and for directing the attention of field repair efforts. The outage information for a trunk is also useful for determining the impact of the outage to customer circuits. This information can be used "proactively" (by notifying the affected customers), or for correlating a customer-reported problem to an outage.

BRIEF DESCRIPTION OF THE FIGURES

Figure 1:
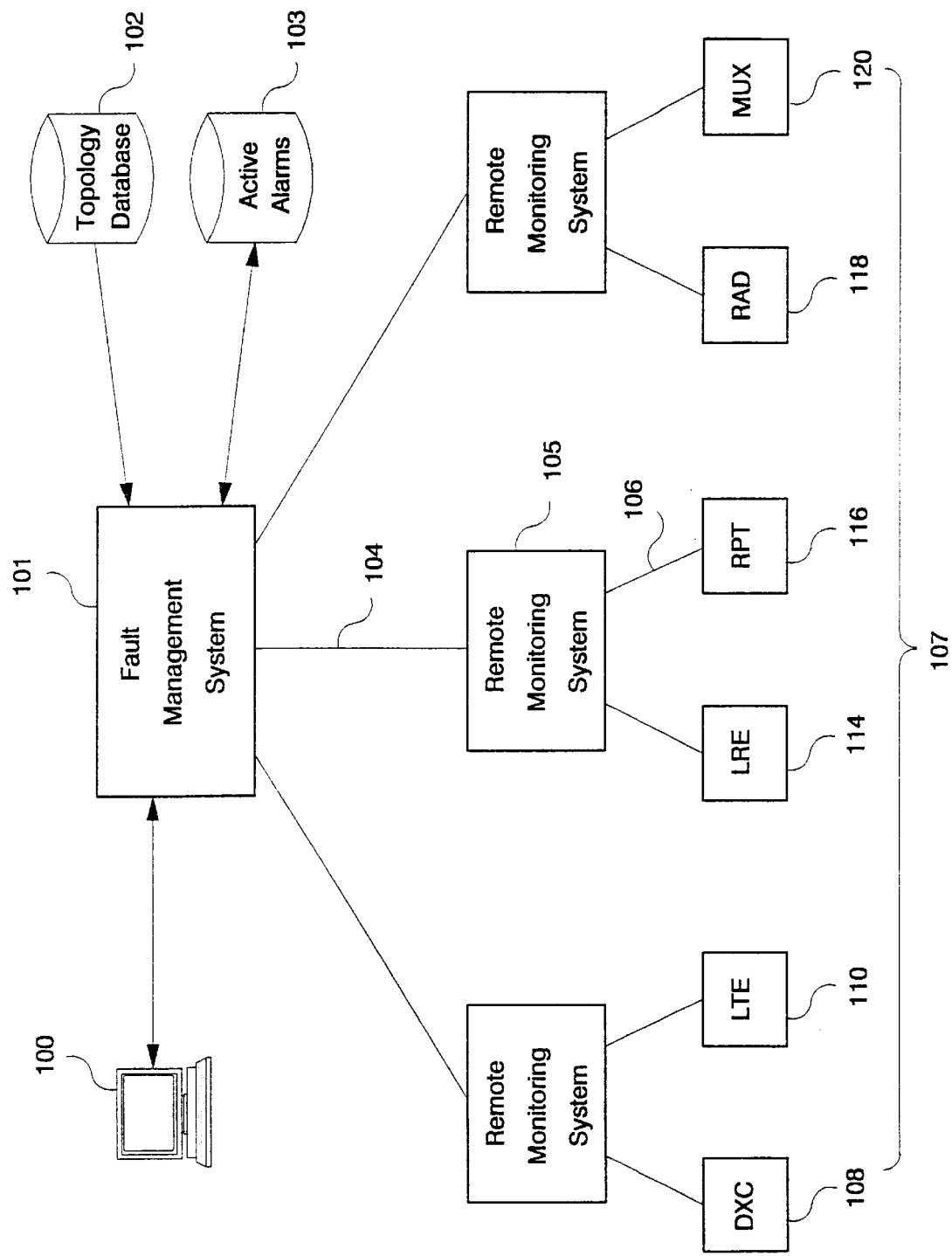

The above-mentioned objects and advantages of the present invention will be more clearly understood when considered in conjunction with the accompanying drawings, in which:

FIG. 1 is a block diagram depicting the Fault Management System environment in which the invention operates.

FIG. 2A–2F present a flow chart of operative steps carried out in a preferred embodiment of the invention. (It should be understood that these diagrams are not represented as a complete set of flow charts such as might be prepared for a specific implementation of the invention; rather, the charts present the primary operative logic, whereas some of the processing details that would be required for the depicted operations are indicated or implied in the following Detailed Description.)

Figure 3:
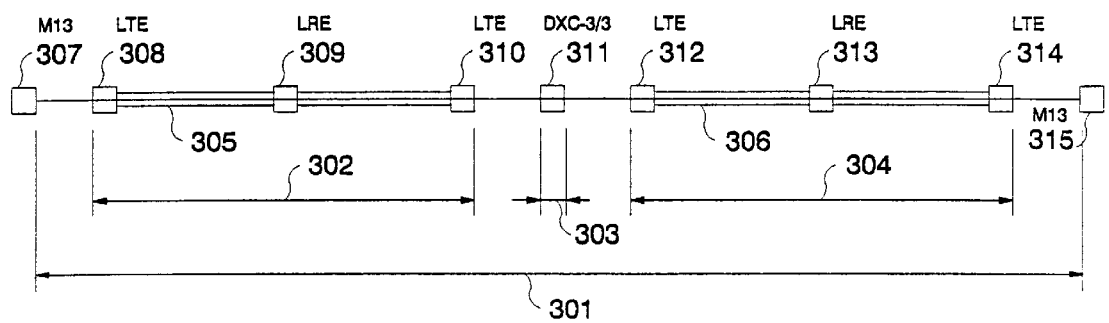

FIG. 3 is a schematic representation of a DS-3 circuit traversing two fiber-optic transmission systems with a DXC-3/3 (a DXC with DS-3 inputs and outputs) between the two systems, which will be used to describe the pertinent features of the topology database.

Figure 4:
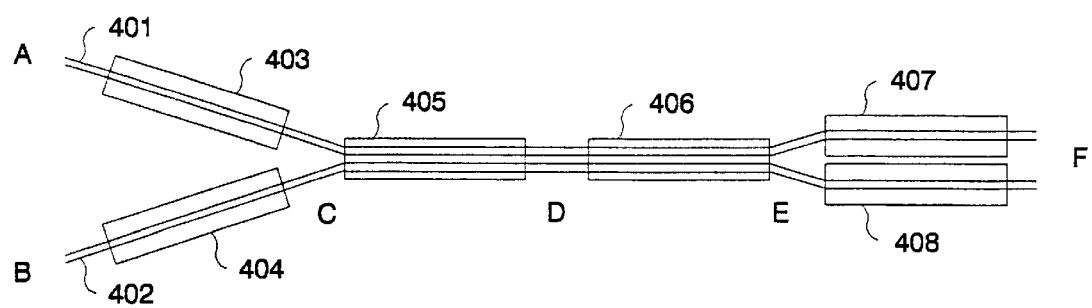

FIG. 4 is a schematic representation of several circuits carried by several trunks, which demonstrates some of the network topological relationships and considerations that will be discussed in the following Detailed Description of the invention.

DETAILED DESCRIPTION OF THE INVENTION

Telecommunications networks are typically monitored by Remote Monitoring Systems (RMSs), as shown in FIG. 1 105, collocated or in close geographic proximity with the network equipments 107. The equipments of interest for this invention include digital cross-connects (DXCs 108), light terminating and regeneration equipments (LTEs 110 and LREs 114), radio transmitters and repeaters (RADs 118 and RPTs 116), and multiplexers (MUXs 120). The RMS devices mediate the exchange of data 106 with these network equipments. Fault alarms, status information and performance statistics are collected from the equipments, and various control commands are sent to the equipments. These RMS devices report the collected data 104 to a central Fault Management System (FMS) 101, and the devices receive control commands from users or from automated processes on the FMS. The FMS will provide a user fault alarm display and control command interface 100.

The RMS devices are designed to communicate with the disparate equipments using a wide variety of communications protocols and data formats. These RMSs must also exchange data with the FMS in a fairly standard format (although the precise content of exchanged messages will typically be specific for a particular type of equipment). The RMS will time-stamp the fault alarm messages before sending them to the FMS. The fault occurrence times are required by the outage analysis process described herein. Therefore, the clocks on all the remote monitoring devices must be synchronized to some known accuracy.

This invention includes a process that executes, continuously and automatically, on the central FMS. Such FMS systems typically contain a process that receives messages from the RMSs, recognizes the device-specific format of each message, and extracts individual data elements from the message for the convenience of other processes executing on the FMS (alarm reporting, for example). This invention contains an interface, shown in FIG. 2A, to the message reception process to extract only certain selected fault alarm messages as indicated in step 201. That is, those fault alarms indicating a circuit or trunk traffic outage, plus the messages that indicate that such a fault condition has now "cleared".

The first step in the process implemented by this invention is to maintain a database of all active fault alarms 103, using the equipment-identifying data (extracted from the alarm message) as the index key. For equipments that handle multiple circuits, such as multiplexers and cross-connects, the alarm data must also include other information (a port identifier, for example) to indicate which specific circuit on that equipment is in alarm. New alarms (step 202) are added to this database at step 203, and cleared alarms are removed at step 204.

For new alarms (202) that are added to the active alarm database (203), the next step 211 (FIG. 2B) in this process is to use the equipment-identifying data to search the network topology database 102.

Reference is now made to FIG. 3 to describe the pertinent structure of the topology database. This schematic shows a DS-3 circuit (301) between two M13s (DS-1-to-DS-3 multiplexers), 307 and 315. From M13 307, the DS-3 is directly connected to a port on the Light Terminating Equipment (LTE) 308, which is at the same location as M13 307. (LTE 308 will combine several such DS-3 circuits, the number depending on the transmission speed of the system.) This fiber optic system (305) terminates at LTE 310, with one Light Regenerating Equipment (LRE) station (309) between the two terminating sites. The DS-3 circuit is then connected to a port on a DXC-3/3 (311), which is at the same site as LTE 310. From the appropriate cross-connected port on DXC 311, the DS-3 is connected to another LTE (312) at the same site, which constitutes one end of fiber-optic system 306. System 306 passes through LRE 313 and terminates at LTE 314. The DS-3 circuit is then connected from the appropriate port on LTE 314 to M13 315, which terminates the DS-3.

The topology database can identify circuit 301 with an arbitrary but unique number. A circuit record with this key will identify the "left" and "right" circuit end points, which in this example are the M13s 307 and 315 respectively. In a separate circuit "segment" table, the database will define the equipment connections necessary to build the DS-3 circuit through the network. In the diagram, circuit 301 is composed of three segments: 302, 303, and 304. These segment records are numbered in the "left to right" direction. (The choice of which end is "left" and which "right" is arbitrary; it is only necessary that the numbering represents the true physical ordering of the DS-3 connection points.) In each case, a segment consists of a pair of DS-3 ports. For example, segment 302 consists of a "left" DS-3 port on LTE 308 and a "right" DS-3 port on LTE 310. That is, segment 302 represents the entry and exit points for DS-3 circuit 301 as it traverses the fiber-optic trunk 305, and there are no other DS-3 level connections for the circuit between these two points. Circuit segment 304 is similar for traversing trunk 306. Segment 303 represents the "left" and "right" DS-3 ports of the cross-connection made within DXC 311.

The database entry for segment 302 will contain an explicit reference to fiber-optic trunk 305 as the carrier for that segment, and segment 304 will reference trunk 306 as its carrier. Segment 303 is simply a cross-connection, with no associated trunk.

The topology data elements necessary for this invention are thus:

Circuit table:
Circuit identifier
Circuit capacity (e.g. DS-3)
Left end site identifier
Left end equipment type (e.g. M13)
Left end equipment uniqueness identifier at that site
Left end equipment circuit identifier (e.g. port number)
Right end station identifier
Right end equipment type
Right end equipment uniqueness identifier at that station
Right end equipment circuit identifier
Segment table:
Circuit identifier
Segment sequence number
Left side site identifier
Left side equipment type
Left side equipment uniqueness identifier at that site
Left side equipment circuit identifier
Right side site identifier
Right side equipment type
Right side equipment uniqueness identifier at that site
Right side equipment circuit identifier
Circuit identifier of any carrier trunk for the segment Returning to the flow chart in FIG. 2B, the received alarms will identify the specific equipment reporting the alarm. Generally, these data are: the equipment location or site; the equipment type (which implies function, capacity, etc.); a uniqueness identifier for that equipment type at that site; and usually a port number on that equipment. The topology database search 211 will attempt to find this connection point, either as an end point of a circuit or of a segment. The results of this database search will include: the identifier for the circuit (301) associated to that equipment connection point; the segment sequence number (which indicates, as explained above, the relative location of that equipment point along the circuit route); and a direction indicator (which is also relative to the other equipment points along the circuit route). These data are sufficient for correlating all fault alarms along the same circuit. That is, when evaluating the significance of a given alarm, it is not necessary to query the database for the full topology of the circuit, then check to see if any alarms have been received for any of those points. Rather, if any other alarms are associated to the same circuit identifier, then it is possible to relate the given alarm to the others, topologically, using the sequence numbers and direction indicators found in the database.

Specifically, for the purpose of evaluating a given alarm's significance, it is possible to determine whether any of these conditions exist: another alarm is "upstream" from and in the same traffic direction as the given alarm point; another alarm is "upstream" in the opposite direction (or "return path") from the given point; another alarm is on the next adjacent circuit segment, either in the same or opposite direction; or another alarm exists on the opposite side of the same circuit segment as the given point.

In step 212 the active alarm that is being processed in step 203 is added to the Active Alarms Database.

The analysis of a given fault alarm (213) is largely dependent upon the precise behavior of the reporting equipment. Therefore, it is necessary to consider the device type and the alarm type in determining the significance of a given alarm. This part of the analysis might be implemented with "truth tables" or with a rule-based "inference engine", or a combination of both. Each truth table entry or rule condition must first specify an alarm and device type to be operated upon and the conditions necessary to consider that alarm "significant" (with respect to any other alarms present on the same circuit).

(Although the analysis process might also be implemented directly in code, using truth tables or inference engine rules allows ease of maintenance when new alarm analysis requirements are identified by the system users or when new equipment types are added to the network. The topology-based fault analysis implemented by this invention will be described in very general terms, but in practice it is highly desirable to have precise processing and reporting control over each specific alarm produced by each particular type of equipment.)

Of consideration in implementing this analysis process is the difficulty of making all rules or truth table entries mutually exclusive, such that one and only one rule condition or table entry will be found to be true. Constructing each rule such that it is explicitly exclusive of all others would require constructing each with full knowledge of all the other rules; this would be tedious and would create a potential for problems if any rules need to be changed in the future. It is therefore desirable to arrange that rules or truth table entries will be evaluated in some prioritized order, such that the "most significant" result will be derived first and any other possibilities will not be evaluated. In general, the "most significant" result is the one that is "most informative" or is indicative of the "most serious" problem, but the choice is sometimes arbitrary.

Figure 2A:
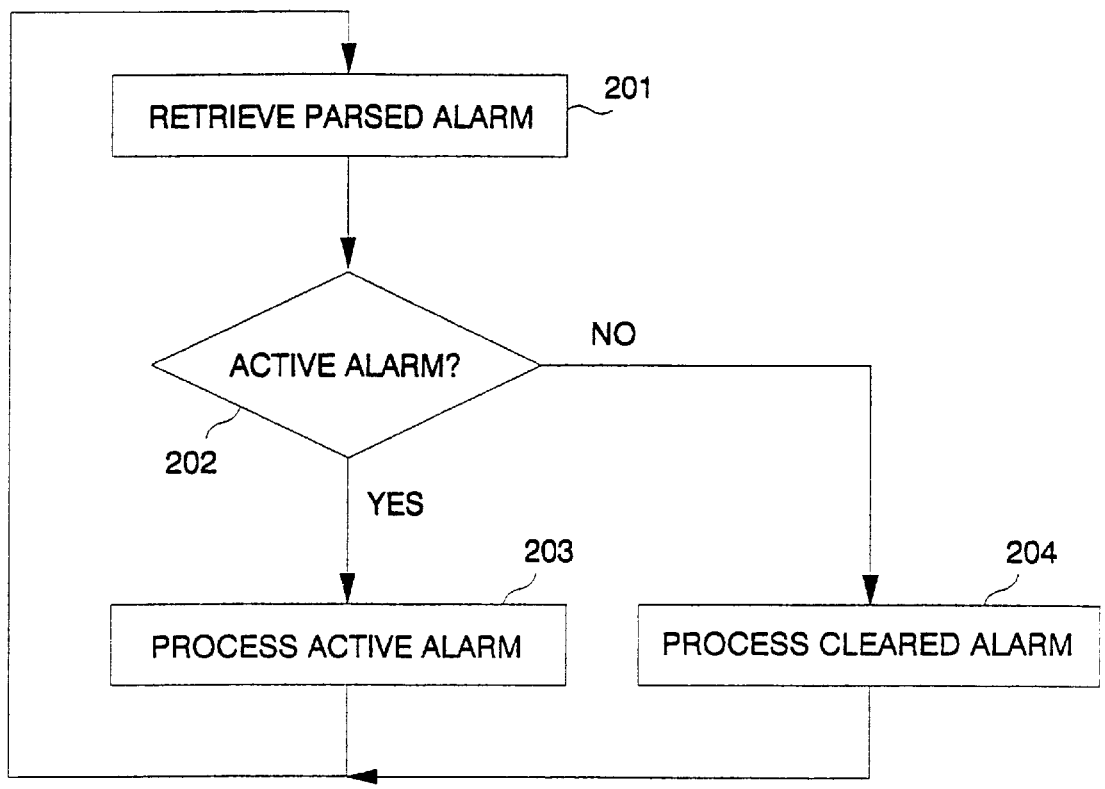
Figure 2B:
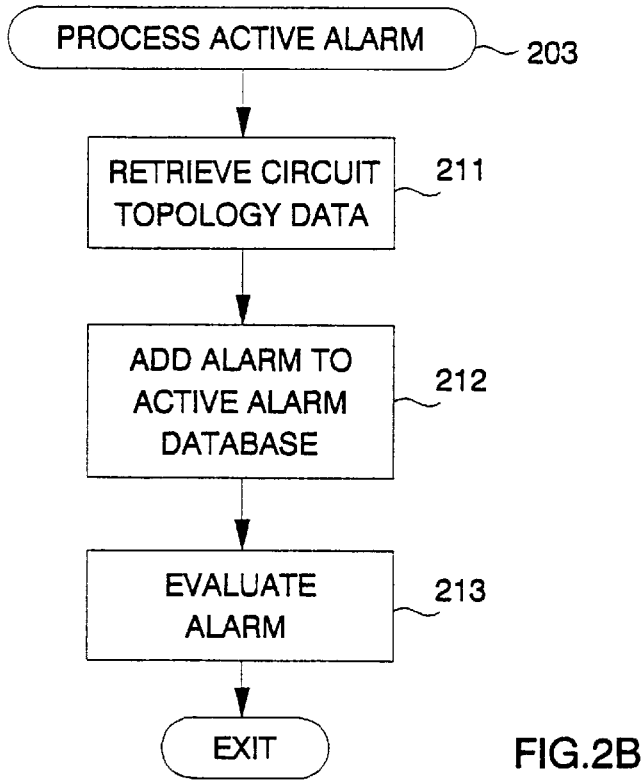
Figure 2C:
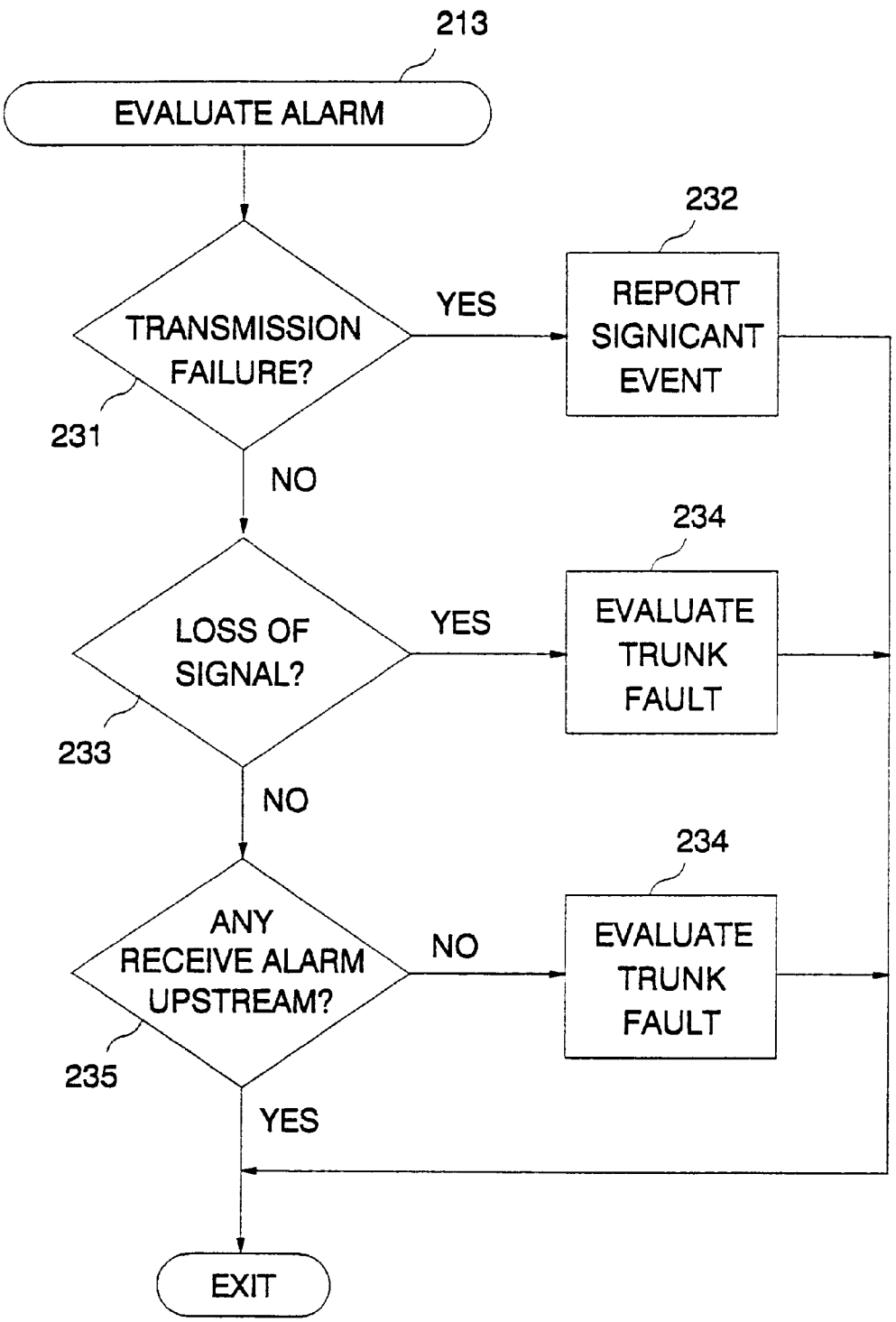

Reference is now made to FIG. 2C, which depicts the effective algorithm implemented by the first level of fault analysis rules. In these rules, one important distinction to be made in alarm types is that between signal transmission (output) faults and signal reception (input) faults (231). A transmission fault needs no further analysis by the topological correlation process. The exact cause, location, and traffic-bearing impact of the fault is fully known. A transmission fault is therefore reported immediately as a significant event (232). One of the rules for analyzing DS-3 DXC equipment alarms, for example, would have this general form:

IF a "lost transmit output" alarm occurs on a DXC DS-3 port THEN report the alarm as a significant event.

Some equipments will detect and report a signal reception failure (e.g., "loss of signal") that can only be caused by a circuit fault immediately upstream from the equipment. Such alarms are generally taken as significant for locating the location of the failure (233). Unlike the transmission fault alarms, however, the cause and precise location of the problem is not known, so these alarms need to be correlated with other alarms to determine if a higher-order outage can be inferred (as explained below). This analysis is done in step 234. The DS-3 DXC rule for processing this type of alarm might have this (somewhat simplified) form:

IF a "loss of signal" alarm occurs on a DXC DS-3 port THEN analyze for possible trunk alarm upstream.

If the alarm message indicates only that some signal fault has been detected somewhere upstream (e.g., "alarm indicator signal" in the same direction or "return alarm indicator" in the opposite direction), then the source of the problem could be in any of the upstream equipments or transmission media, either at the same multiplex level (i.e., on the same circuit) or at any higher level (i.e., on any trunk containing the circuit). Determining whether or not such an alarm is a significant event for locating the fault requires that the truth table entry or inference engine rule be able to test for other alarms upstream from the given alarm (235). A typical rule for DS-3 DXC equipment might be:

IF an "alarm indicator signal" occurs on a DXC DS-3 port
AND no other fault alarms exist upstream on the same DS-3 circuit
THEN analyze for possible trunk alarm upstream.
(In a "truth table" implementation, each distinct test necessary for any rule would be represented as a column in a table, and each rule would specify a value of "true", "false", or "don't care" for each of these columns. An additional column would specify an action to be taken if all of these condition specifications are satisfied when the rule is applied to a given alarm.)

Note that alarms are received one at a time in an unpredictable order. It is therefore not desirable to check immediately for any upstream alarm conditions; they might not have been processed yet. A small delay time should be introduced into the evaluation of these rules to allow any possibly correlated alarms to be processed.

Also note that any alarms that are actually correlated to the same problem should have approximately the same reporting time-stamp (affixed by the RMS devices), plus or minus the device-dependent alarm reporting latency and the maximum difference between remote clock times. This time-stamp correlation condition should also be specified by the alarm analysis rules.

Figure 2D:
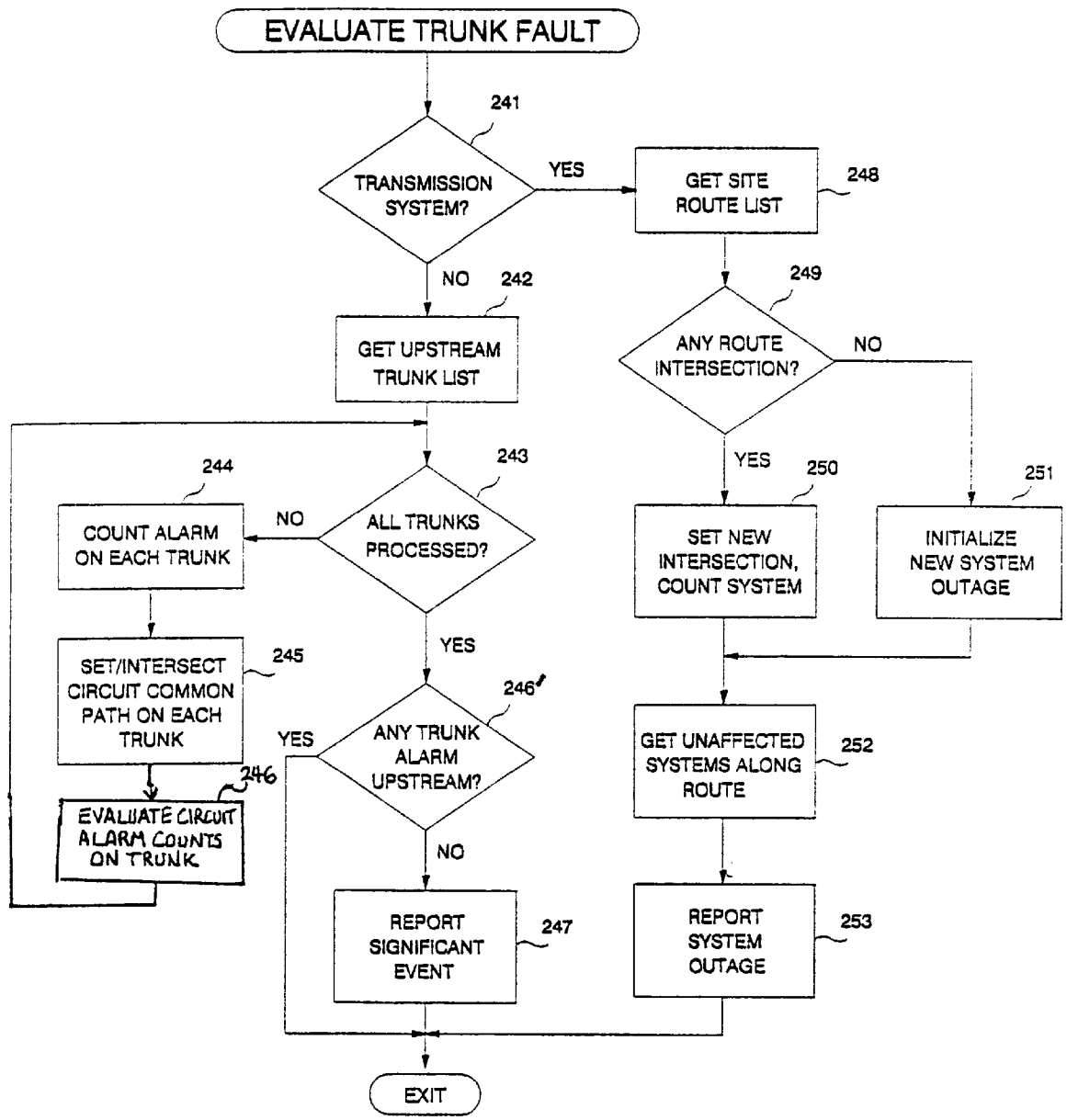

In FIG. 2C, any circuit alarm that appears to be significant by test 235 is also presented to process 234 for analysis of possible upstream trunk faults. The flow chart for process 234 is shown in FIG. 2D.

The first step in this analysis (241) is to determine if the given alarm is on a transmission system at the highest multiplex level (which therefore is not carried by any higher-level trunks), or on some lower level circuit. Any circuit alarms below the transmission system level (that is, the DS-3 level and below) are presented to a multiplex-hierarchy level of analysis.

This hierarchy analysis attempts to correlate circuit alarms to any upstream trunk alarms or to infer trunk failures from alarms on the contained circuits. The topology database is searched (242) to get a list of all trunks upstream from the reported fault alarm. (Referencing FIG. 3 again for an example, if an alarm is received on the "right" side of DXC 311, which is in segment 303 of circuit 301, then all higher seaments for 301 would be retrieved and all trunk associations for those segments would be returned, which in this example would only be trunk 306.) A failure on any of these upstream trunks could be the cause of the circuit alarm indicator signal.

Each of these upstream trunks is processed in turn (243). On each trunk, a circuit alarm counter is incremented (244). The directionality of the circuit alarm with respect to the trunk is significant and separate counters must be maintained for circuit alarms in each direction. (For simplicity, this complication will generally be omitted from the following discussion; but in all references to circuit alarm counts on trunks, each direction on the trunk must be considered separately.) This circuit alarm count serves two purposes: first, if an explicit fault alarm is reported for that trunk, then the presence of alarms on the contained circuits provides a confirmation that the trunk fault is actually causing a traffic outage; and second, a fault on a trunk can be inferred if a majority of the circuits on that trunk report alarms.

For efficiency in later processing, some additional processing (245) can be performed as the circuit alarm is counted on each of the upstream trunks. If the circuit alarm is the first alarm to be counted on a given trunk, or if the time-stamp of the alarm falls outside the window for presuming correlation with any previous alarms, then the time-stamp of that alarm and the set of all upstream trunks are stored in the data structure representing the trunk. Otherwise, if the circuit alarm is not the first one to be counted on a given trunk and the time-stamp of that alarm is within the window necessary for presuming correlation with the previous alarms, then the set of upstream trunks for the new alarm is intersected with that of the previous alarm or alarms (that is, all trunks common to both sets are extracted), and the new list is stored in the trunk data structure. This intersection set will be referred to as the "common path set" for the circuits on the trunk: at any given time, this is the set of trunks that contain all of the same circuits as those counted on the given trunk. (This set always contains the given trunk itself, and it may contain only that trunk if the circuits do not have any other trunks in common.) The significance of this common path set is that the circuit alarms counted on the given trunk could actually be caused by an outage on any of these trunks.

Every time that a circuit alarm counter is incremented on a given trunk, then that trunk is evaluated (246) to determine if a fault can be inferred from the circuit alarms or if a reported trunk fault can be confirmed to be affecting traffic on the contained circuits.

For maximum flexibility, inferring or confirming a trunk outage from circuit alarms can also be handled with a rule-based inference engine. For example, rules might be written that specify different circuit alarm thresholds depending on the total number of monitored circuits (which may not be all of the circuits carried by the trunk). These rules might require that there be a minimum number of monitored circuits on a trunk for any outage to be inferred, and decreasing percentage thresholds might be specified for increasing monitored circuit counts. These thresholds should be set low enough that outages will be inferred even if some alarms do not get reported for some reason, yet high enough that false inferences are not very probable. False inferences are made much less probable if, again, the time-stamp of each circuit alarm is taken into consideration by the rules: if a trunk failure has caused the circuit alarms, then the circuit alarm times should be within the previously mentioned time frame. Special rules might also be written for specific equipment types that take into account any alarms or combinations of alarms unique to that equipment type.

Figure 2E:
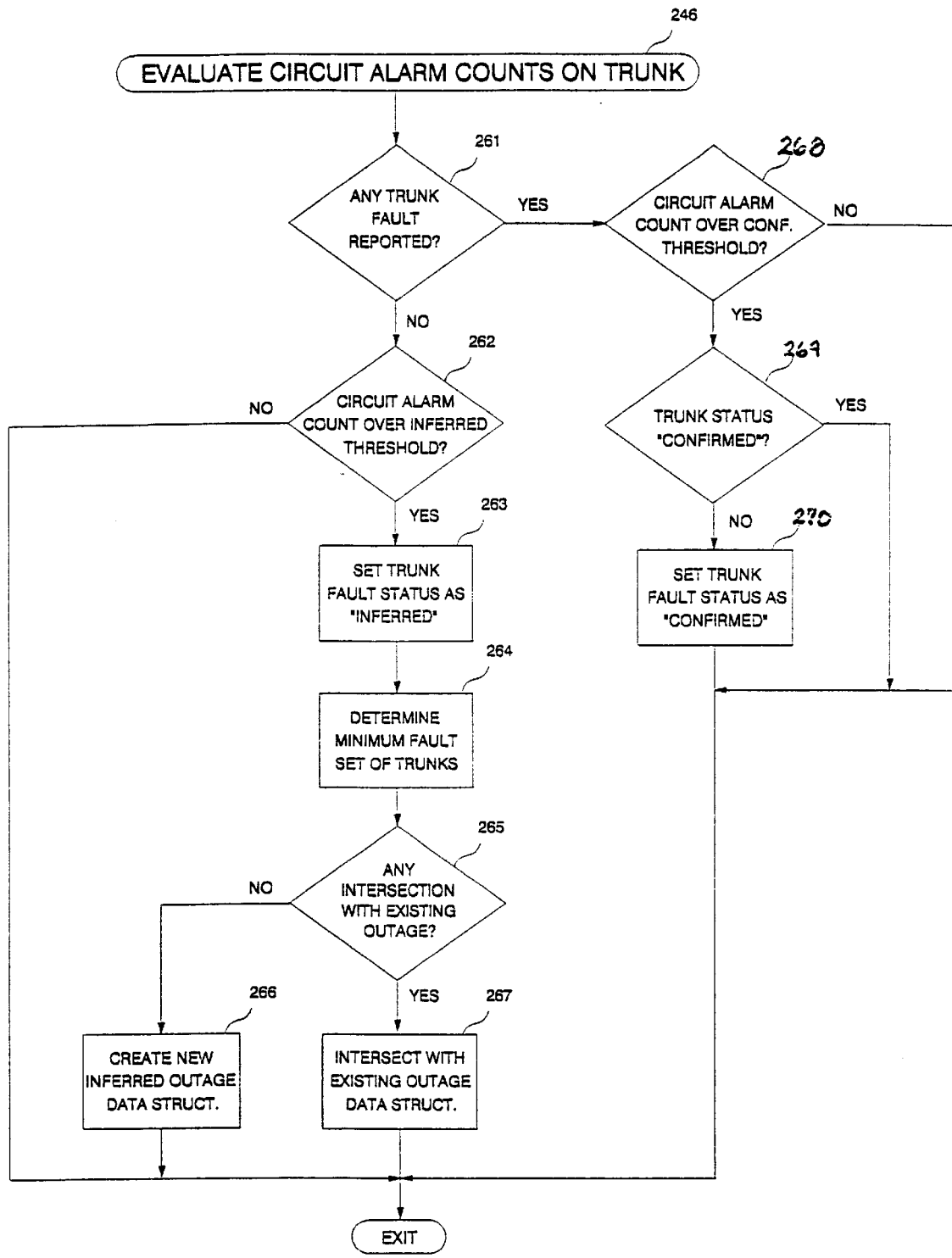

This process, Evaluate Circuit Alarm on Trunk (246), is described in FIG. 2E. Step 261 determines if any fault has already been directly reported (rather than inferred) for that trunk. If so, then the circuit alarm count is compared to some specified "confirmation threshold" value (say for example, 51% or "more than half") in step 268. That is, if a trunk fault has been reported and a sufficient number of circuit alarms have also been reported on that trunk, then the circuit alarms are assumed to confirm that the trunk fault is affecting traffic. If the trunk fault status is not already set to "confirmed" (269), then it is so set in step 270.

If no direct fault has been reported (261), then the current circuit alarm count on the trunk is compared to some specified "inferred fault threshold" (say again, 51% or "more than half") in step 262. The inference is that if a sufficient number of circuit alarms have been reported, then a trunk fault can be assumed the trunk fault status is set to "inferred" in step 263.

In fact, if a trunk has sufficient circuit alarms to infer a trunk fault, it is not necessarily a fault on that particular trunk; the circuit alarms could be caused by a fault on any of the trunks that contain the same set of circuits. It is often the case that a given set of circuits traverse the same set of trunks between monitoring points. In such cases, several trunks may cross their circuit-alarm thresholds because of the same set of circuit alarms. Moreover, if one trunk has reached its circuit-alarm threshold, it is possible that some other trunk containing the same circuits has a directly reported fault, so a fault ought not be inferred on the given trunk. For these reasons, whenever a trunk fault might be inferred from circuit alarms only, an additional step, 264, is necessary to determine the minimal set of trunks on which faults would explain all known circuit alarms.

The general logic of this minimal-trunk-fault determination, which is invoked only for inferred trunk outages, is this:

1. If the set of circuits that are in alarm for a given trunk are also contained in another trunk or set of trunks on which trunk faults have been directly reported, then no outage should be inferred on the given trunk.

2. If the set of circuits that are in alarm for a given trunk are a proper subset of the circuits in alarm for another trunk which has crossed its circuit alarm threshold, then no outage should be inferred on the given trunk.

Otherwise, the trunk should be reported as a possible outage. Reference is now made to FIG. 4, which is schematic representation of several circuits carried by several trunks, to explain these considerations. Assume that 401 is a group of circuits that begin at site A and are carried by trunk 403 to site C, then by trunk 405 to site D, trunk 406 to site E, and finally by trunk 407 to site F. Another group of circuits, 402, begins at site B and are carried by trunk 404 to site C, then by trunk 405 to site D, trunk 406 to site E, and finally by trunk 408 to site F. Furthermore, assume that the circuit groups 401 and 402 have reported circuit alarms, such that all six of the trunks shown in the diagram have sufficient alarms (according to the specified threshold count) to infer that some trunk fault is causing the circuit alarms.

The reasoning behind the first rule above is simply that if a set of circuits passes through a trunk which has a directly reported fault, then no other trunk outages should be inferred from that set of circuit alarms. For example, suppose that trunk 405 has a directly reported fault. When trunks 403, 404, 406, 407, and 408 are individually evaluated by step 264 in FIG. 2E (because each is over its circuit alarm threshold), the trunk fault on 405 should be recognized as the probable cause of all the circuit alarms on each of those trunks, and no other trunk fault should be inferred.

The reasoning behind the second rule above is that if another trunk contains the same circuits plus one or more additional circuits that are in alarm (and the additional alarms occurred within the same time frame), then an outage on this other trunk would explain the circuit alarms on the given trunk, but not vice versa. (When the other trunk is evaluated, it will be reported as an inferred outage because Rule 2 is not true.) For example in FIG. 4, assume that no trunks have reported any faults. When trunk 403 is evaluated, the process should recognize that the same circuits (401) pass through trunks 405, 406, and 407. Now, a fault on either trunk 405 or 406 would explain all of the circuit alarms in group 401, but a fault on trunk 403 would not explain any of the circuit alarms in group 402, which are also present on trunks 405 and 406. Therefore, when trunk 403 is evaluated, no fault should be inferred on that trunk. The same is true when trunks 404, 407, and 408 are evaluated: trunks 405 and 406 carry the same circuits reporting alarms plus additional circuit alarms that cannot be explained by faults on any of those trunks.

If neither of these rules applies to a given trunk, then an inferred outage should be reported for the trunk. However, it is undesirable to report several separate trunk outages that were all inferred from the same set of circuit alarms; it is more accurate (and less confusing to the users) to report that a trunk outage has been inferred, and to include in that one report all possible trunks implicated by the same set of circuit alarms. In FIG. 4, when trunk 405 is evaluated, neither of the above rules applies, so a trunk fault should be inferred for 405, but since trunk 406 carries exactly the same set of circuits, then a single fault should be reported to the FMS users which indicates that either 405 or 406 could be the location of the fault.

Figure 2F:
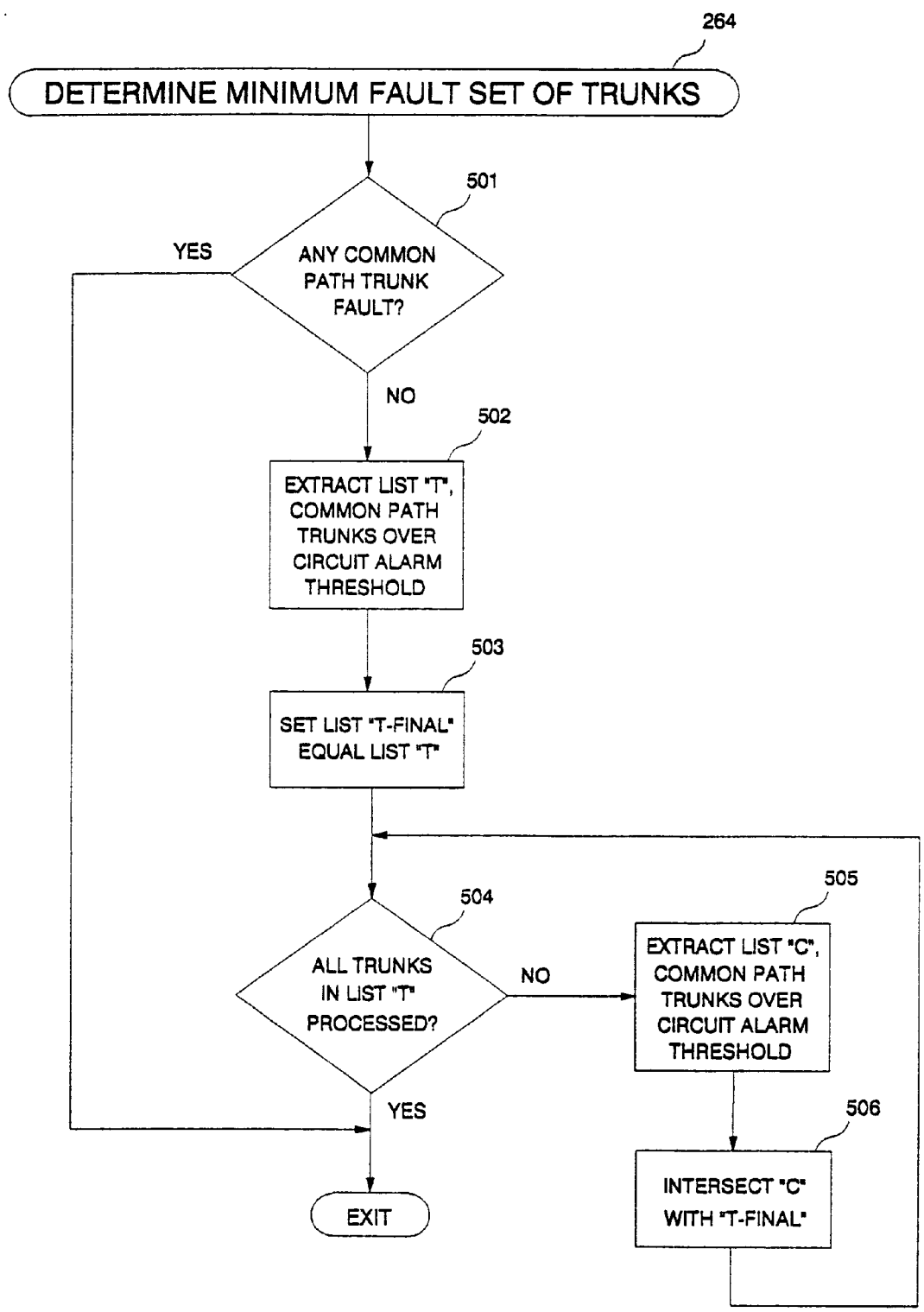

An algorithm that implements these considerations is described in the flowchart (FIG. 2F). As noted previously, each time that a circuit alarm has been counted on a given trunk, the set of trunks upstream from that circuit point have been intersected with the similar set of trunks for any other circuit alarms on that trunk to form the "circuit common path" set; these are the only trunks that need to be examined.

First, in step 501 each of the trunks in the circuit common path set for the given trunk is examined to determine if any these has already reported a trunk alarm; if so, by Rule 1 above, no fault should be inferred on the trunk being evaluated, so no further action is taken.

Otherwise, in step 502 the common path set of trunks is shortened to include only those that are also over their alarm-count thresholds (which list always includes, at least, the trunk under evaluation). The assumption made here is that any trunk that is not over its circuit-alarm threshold is probably not the location of the inferred outage. The final result set is initialized to be this same set in step 503. To determine the minimal set of trunks that should be included in the outage report (that is, possible fault locations), each of the trunks in the shortened common path set is then examined (504). The common path set for each (compiled for the circuit alarms on that trunk) is likewise shortened to include only those that are also over their thresholds (505). The intersection across all of these sets (that is, those trunks that are in all of the lists), step 506, produces the desired result of satisfying Rule 2 above, and it also allows a single outage report to be made listing all possible trunks that might be causing the inferred outage. Note that this intersection set may be a single trunk or several trunks, and it may or may not include the trunk that is currently under evaluation. If there are several trunks in the set, these may be contiguous in the network topology (as are trunks 405 and 406 in FIG. 4), but they are not necessarily so because there might be intervening trunks that are not over their alarm threshold and which were therefore excluded.

The result of process 264 is a list of one of more trunks that could be the location of a fault causing the observed circuit alarms. This list is returned to the Evaluate Circuit Alarm Counts on Trunk process in FIG. 2E. There may be many trunks which are over their circuit-alarm thresholds, which may or may not be in this list, but all of which can be explained by a fault in this set of trunks. Each of these trunks will be evaluated separately, and in fact each of these trunks may be evaluated several times as new circuit alarms are received. Therefore, a separate data structure needs to be maintained to record this inferred fault location. Specifically, this data structure will record whether or not the inferred fault has already been reported, and it will allow detection of any change that requires that the report needs to be updated (such as any shortening or lengthening of the list of possible faulted trunks).

Step 265 compares the existing set of such data structures against the list of trunks produced in step 264 to determine if there is any match or partial match. If no intersection is found with any previously asserted outage, a new data structure is initialized in step 266 to represent the newly recognized trunk outage. A counter is initialized to one, representing the total number of trunks either directly involved in or indirectly explained by the new outage. This counter will be used to determine when the outage has cleared. (Note that the counter is initialized to one, which represents only the trunk currently under evaluation, even if multiple trunks are included in the list. This is because each of those trunks will be evaluated and counted separately.)

If any intersection is found with an existing inferred outage data structure, the association of the new outage to the existing depends on the precise condition of the correlation between the two sets of trunks. There are four possibilities:

1. The newly asserted set of trunks is identical to a previously asserted outage. In this case, no new information about the outage has been determined except that an additional trunk is involved, so the list is unchanged in step 267 but the counter is incremented by one.

2. The newly asserted set of trunks is a proper subset of a previously asserted outage. In this case, the list is assumed to be a better estimation of the outage location (smaller in scope), so the new list of trunks can simply replace the old one in step 267. The trunk counter is again incremented by one.

3. The set of trunks in a previously asserted outage is a proper subset of the newly derived outage. In this case, the larger new set indicates that the inferred outage location needs to be increased in topological scope (because additional trunks have exceeded their threshold since the first evaluation). Again, the new list replaces the old one and the counter is incremented by one in step 267.

4. The newly asserted set of trunks only partially intersects a previously asserted outage list. In this case, the inferred outage location may need to be expanded, contracted, or simply shifted somewhat. This situation can be resolved by taking the union set of the new and the old lists, then for all of those trunks taking the intersection of all common path sets in the individual trunk data structures. Like the initial outage set determination, this is the minimal set that explains all the circuit alarms. This new list replaces the existing one in the inferred outage data structure in step 267 and the counter is incremented.

An "inferred fault" alarm report can be created at this point (268). This inferred alarm can be inserted back into the main process of FIG. 2A and treated as a circuit alarm to be analyzed in relation to higher-order trunks. Such inferred alarms can be treated much like a directly reported circuit alarm except that there may be more than one circuit associated to the alarm (because the fault could not be narrowed to a single trunk at the current level).

Returning now to FIG. 2D, Analyze Trunk Alarm: When all upstream trunks from the reported circuit alarm point have been processed (243), then each of these upstream trunks is checked in step 246' to determine if any of those trunks has any fault, either directly reported in a trunk alarm or inferred from circuit alarms. If no faulted trunks are found, then the circuit alarm is assumed to a significant, reportable event (247). Otherwise, the circuit alarm is ignored, since the upstream trunk fault explains the circuit alarm.

In step 247, a check should also be made to see if any lower-multiplex-level circuits contained within the subject circuit have already reported alarms (unless the subject circuit is at the lowest level processed by the system.) If there are any, then the number of reported "sub-circuit" alarms should be compared to the confirmation threshold. If the number of such alarms is over the threshold, then the event can be reported as a "confirmed" outage; otherwise, it can be reported as "unconfirmed".

Returning to the top of FIG. 2D: If the input alarm is on a transmission system at the highest multiplex level (241), then a different type of analysis is implemented. This analysis intends to correlate outages on transmission systems that share a common physical route in the network. Although not part of the signal multiplexing hierarchy, fiber-optic cables and radio transmitter towers typically carry multiple transmission systems; therefore damage to a single cable or tower can affect multiple systems. For the benefit of the Surveillance and Restoration users of the FMS system, such multiple-system outages should be combined into a single report.

To implement this system common-route analysis, the topology database is searched in step 248 to retrieve the ordered list of sites through which the given system traverses. A separate set of data structures is maintained to represent the transmission system outages. One of these structures can represent a single system outage (if no other failed system shares the same network route) or several individual system outages that all share some common route in the network.

This set of system outage structures is searched in step 249 to determine if the route of the system being processed has any intersection with any other failed systems. This intersection is determined by comparing all adjacent site pairs; specifically, if any pair of consecutive sites in the system route are also a consecutive pair of sites in another system's route (in either order), then that site pair is part of the intersection between the two system routes.

If no such intersection is found, then a new system outage data structure is initialized (251) to represent the new system fault. If any intersection is found, then the new system outage is associated to it in step 250. If there is only a partial intersection between the given system route and a previously reported system outage, then the intersection list of sites is reset to include only the site pairs common to all systems associated to the multiple-system fault. (This intersection can only become shorter.) A counter is incremented to record the number of systems associated to the outage.

Whether or not any route intersection is found, the transmission system fault needs to be reported. Again for the benefit of the FMS users, this report should indicate if there are any unaffected systems along that network route. (Restoration is particularly interested in this information, since unaffected systems might be used for traffic restoration without having to find an alternate network path). The topology database is searched in step 252 to retrieve all transmission systems that traverse the same set of sites, and any that are not already associated to the outage are presumed to be "unaffected" in the system outage report (253).

Returning now to FIG. 2A: When an alarm condition clears, a message similar to an alarm will be received. Like an alarm, these messages will indicate the specific equipment and the original fault condition that is now clear. Step 204, Process Cleared Alarm, is fairly straight-forward:

1. The data structure representing that alarm can be deleted.
2. If the alarm was reported to the users as a significant event, then an alarm clearance report needs to be made.
3. If the alarm was counted as a circuit alarm on one or more trunks, then those counters needs to be decremented.
4. If such a trunk in step 3 had an inferred outage as a result of circuit alarms, then it needs to be re-evaluated to see if any outage can still be inferred. If not, then that inferred alarm needs to be cleared. (Since such an inferred trunk alarm was treated like a circuit alarm at the next-higher multiplex level, the cleared alarm must also be treated in a similar manner.)
5. If the circuit alarm counter for a given trunk in step 3 reaches zero and there have been no directly reported faults on that trunk, then the trunk data structure can be deleted.

This completes the description of the major processing steps implemented by the invention.

Because this analysis process includes provisions for using fault alarm data to confirm a traffic-affecting outage, and since the analysis has already correlated equipment alarms to network circuits, the output of this analysis is readily usable to assess the impact of confirmed outages to dedicated customer circuits. An auxiliary process can be established, driven by the confirmed outages of this process, which uses a customer circuit database to identify the affected customers. Critical customers can be pro-actively notified of the outage. All affected customer circuits can be logged in a database in case later trouble reports need to be investigated. If the time of a customer-reported problem corresponds to a logged entry, then the problem can positively be correlated to the outage.

It should be understood that the invention is not limited to the exact details of construction shown and described herein for obvious modifications will occur to persons skilled in the art.

I claim:

1. In a telephone network having multiplexer and transmission equipment, a fault detection system comprising:

means for sensing faults occurring in particular components of the network and generating fault alarm data therefrom;

the alarm data propagated downstream through the network for collection at a fault management end point;

a database that characterizes the topology of the network, located at the fault management end point, and containing entries that define the routing of circuits and trunks through the network, and more particularly define (a) which trunk or ordered sequence of trunks contain a given circuit;
(b) which circuits are contained within a given trunk; and
(c) the topological route through the network for any given circuit or trunk;

means for correlating the alarm data with the database for producing information regarding (d) significant fault alarm events distinguished from sympathetic events, to determine the topographic point of failure;

(e) inference of an outage on a trunk, where no fault alarms are directly received from trunk equipment, but where correlated alarms on multiple circuits contained within the same trunk are detected; and (f) confirmation of an outage, where direct alarms have been reported on a trunk; and means for storing data relating to any active alarm data;

wherein the means for correlating the collected alarm data with the database further includes means for resetting a previously set circuit alarm counter to zero for all upstream trunks extracted from the topology database;

means for determining whether a detected circuit alarm is the first to be counted on an upstream trunk;

in the event it is the first to be counted, means for storing an alarm time stamp and a set of all upstream trunks for the circuit for which an alarm is detected;

in the event it is not the first to be counted, means for determining whether the alarm has been received within a pre-selected time window relative to a previous count of a corresponding circuit alarm counter;

in the event that it is within the window, means for incrementing the circuit alarm counter and determining a common path set;

in the event that it is not within the window, means for determining whether the fault has been explicitly reported or inferred for the affected trunk;

in the event that it has been explicitly reported, means for ignoring the alarm as spurious;

in the event that it has not been explicitly reported, means for resetting the circuit alarm counter to 1 and storing as new alarm data
  (a) a reset circuit alarm time; and
  (b) a list of upstream trunks.

2. The system set forth in claim 1 further comprising means for suppressing storage of an alarm that lacks information concerning the location of a fault along a circuit or trunk.

3. The system set forth in claim 1 further comprising means for inferring an outage on a trunk, in the absence of a direct alarm on that trunk, if a majority of the monitored circuits contained in that trunk have reported alarms.

4. The system set forth in claim 3 further comprising means for comparing, during correlation, the routes of failed circuits in inferred locations for determining the trunk or minimal set of trunks along which an inferred or directly reported outage would satisfy all known circuit alarms.

5. The process set forth in claim 1 further comprising means for displaying the most significant alarms directly reported by network equipments or inferred from multiple alarms, wherein sympathetic alarms, caused by the significant alarms propagated downstream, are excluded.

6. The system set forth in claim 1 further comprising means for consolidating all directly and inferred outages, and determining, from the database, whether alternate routes are available for bypassing the outages.

* * * * *